(12) United States Patent
Chen et al.

(10) Patent No.: US 11,893,168 B1
(45) Date of Patent: Feb. 6, 2024

(54) DOUBLE SIDE-SCROLL MOUSE DEVICE

(71) Applicant: SUNREX TECHNOLOGY CORP., Taichung (TW)

(72) Inventors: Chun-Chieh Chen, Taichung (TW); Che-Hsun Chang, Taichung (TW); Chi-Shu Hsu, Taichung (TW); Chang-Cheng Lee, New Taipei (TW)

(73) Assignee: Sunrex Technology Corp., Taichung (TW)

( * ) Notice: Subject to any disclaimer, the term of this patent is extended or adjusted under 35 U.S.C. 154(b) by 0 days.

(21) Appl. No.: 18/315,794

(22) Filed: May 11, 2023

(30) Foreign Application Priority Data

Feb. 21, 2023 (TW) .................................. 112201526

(51) Int. Cl.
*G06F 3/0354* (2013.01)
*G06F 3/0362* (2013.01)

(52) U.S. Cl.
CPC ........ *G06F 3/03543* (2013.01); *G06F 3/0362* (2013.01)

(58) Field of Classification Search
None
See application file for complete search history.

(56) References Cited

U.S. PATENT DOCUMENTS

2021/0041963 A1\* 2/2021 Fukumoto ............... G06F 3/016

\* cited by examiner

*Primary Examiner* — Stephen T. Reed
(74) *Attorney, Agent, or Firm* — Burris Law, PLLC

(57) ABSTRACT

A double side-scroll mouse device includes a housing unit, a main button unit, and a side scroll unit. The housing unit has a lower casing and a casing side skirt. The lower casing has spaced-apart first and second lateral face portions. The casing side skirt has a first operating wall extending upwardly from one of the first and second lateral face portions, and a second operating wall portion extending upwardly from the first operating wall portion. The side scroll unit includes a first scroll wheel member that is disposed on the first operating wall portion and that is rotatable about a first axis, and a second scroll wheel member that is disposed on the second operating wall portion and that is rotatable about a second axis being substantially perpendicular to the first axis.

10 Claims, 5 Drawing Sheets

DOUBLE SIDE-SCROLL MOUSE DEVICE

CROSS-REFERENCE TO RELATED APPLICATION

This application claims priority to Taiwanese Utility Model Patent Application No. 112201526, filed on Feb. 21, 2023.

FIELD

The disclosure relates to a computer mouse, and more particularly to a double side-scroll mouse device.

BACKGROUND

A conventional computer mouse includes a lower casing, an interface circuit that is disposed in the lower casing, a control circuit that is disposed in the lower casing and that is electrically connected to the interface circuit, a right mouse button that is disposed above the lower casing and that is electrically connected to the control circuit, a left mouse button that is disposed above the lower casing and that is electrically connected to the control circuit, and a scroll-wheel that is located between the left and the right mouse buttons, and that is electrically connected to the control circuit.

The conventional computer mouse is electrically connected to a computer and operated by a user. The user may input commands via the left and right mouse buttons or the scroll-wheel. The commands are then transmitted to the computer via the interface circuit as electric signals. However, during the operation of the conventional computer mouse, the user may only use the scroll-wheel to scroll vertically, and the conventional computer mouse does not provide the user with the option to scroll horizontally. Therefore, there is room for improvement of the conventional computer mouse.

SUMMARY

Therefore, an object of the disclosure is to provide a double side-scroll mouse device that can alleviate at least one of the drawbacks of the prior art.

According to the disclosure, the double side-scroll mouse device is adapted to be operated by a thumb, an index finger and a middle finger of a user. The double side-scroll mouse device includes a housing unit, a main button unit, and a side scroll unit. The housing unit has a lower casing and a casing side skirt. The lower casing has a bottom face portion, an extension face portion disposed above, surrounding, and connected to the bottom face portion, a first lateral face portion disposed above and connected to the extension face portion, and a second lateral face portion disposed above and connected to the extension face portion, and spaced apart from the first lateral face portion in a left-right direction. The casing side skirt is connected to the lower casing, and has a first operating wall portion extending upwardly from one of the first lateral face portion and the second lateral face portion of the lower casing, a second operating wall portion extending upwardly from an upper end of the first operating wall portion, and a palm supporting portion connected to the first operating wall portion and the second operating wall portion and cooperating with the first operating wall portion and the second operating wall portion to cover the lower casing. The main button unit includes a first mouse button that is located above the housing unit and that is adapted for operation by the index finger, and a second mouse button that is located above the housing unit and that is adapted for operation by the middle finger. The side scroll unit includes a first scroll wheel member that is disposed on the first operating wall portion and that is rotatable about a first axis being perpendicular to the left-right direction, and a second scroll wheel member that is disposed on the second operating wall portion and that is rotatable about a second axis being perpendicular to the left-right direction and being substantially perpendicular to the first axis. The first and second scroll wheel members are adapted for operation by the thumb.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
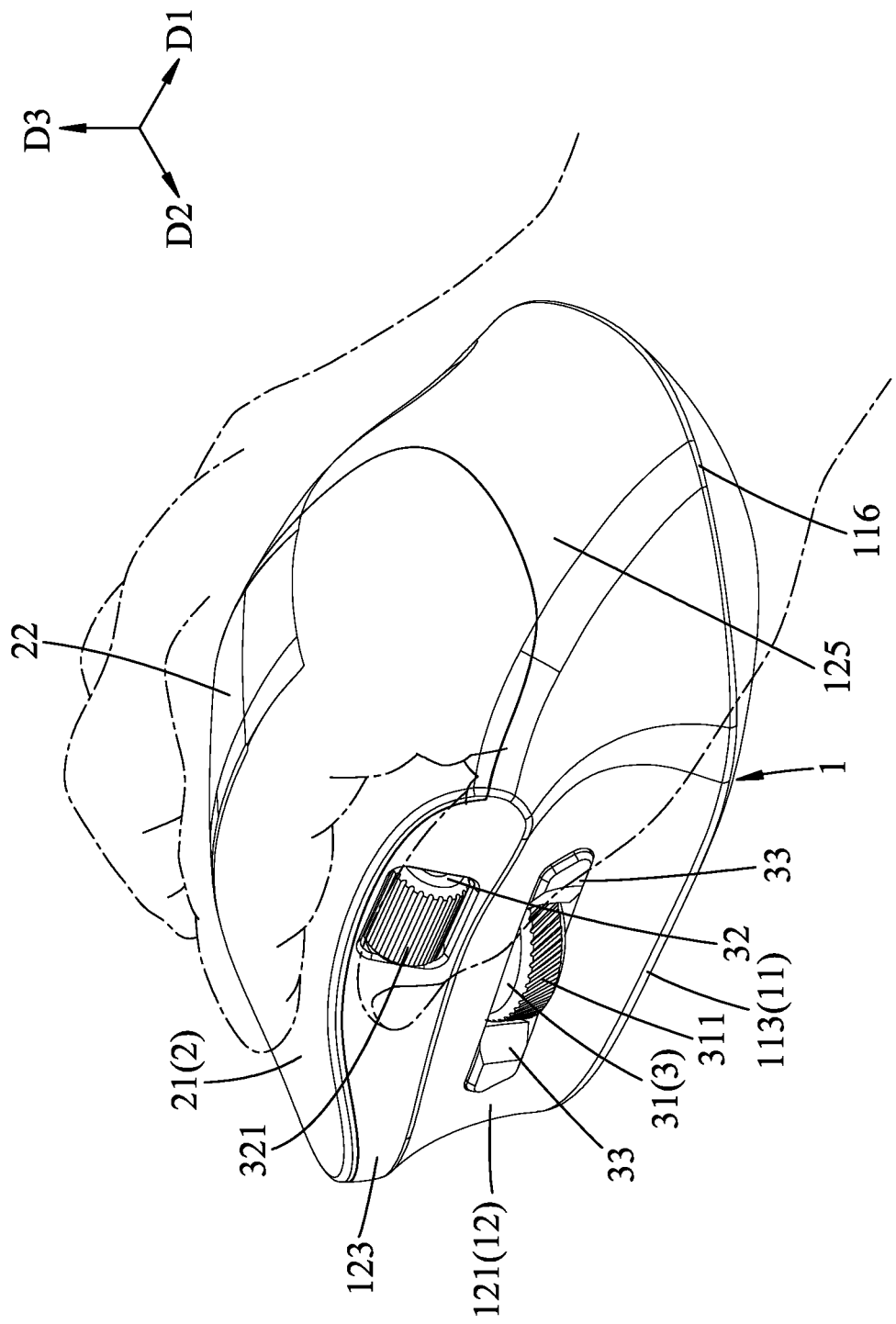
FIG. 1 is a schematic perspective view showing an embodiment of a double side-scroll mouse device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
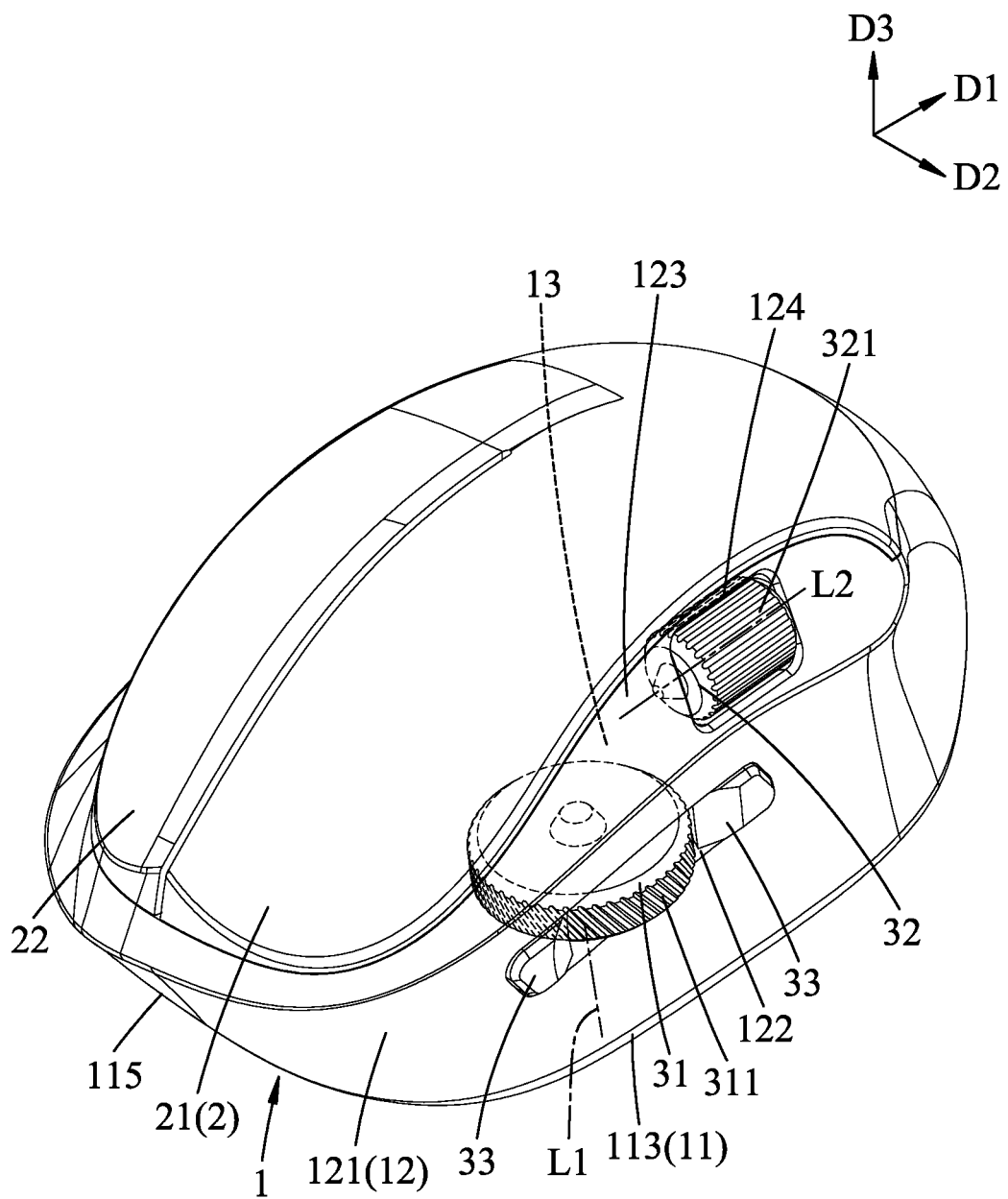
FIG. 2 is a schematic perspective view showing a first scroll wheel member and a second scroll wheel member of a side scroll unit of the embodiment.

Referring to FIGS. 1 and 2, an embodiment of the double side-scroll mouse device according to the present disclosure is adapted to be electrically connected to a computing device (not shown) and operated by a user. The user may input commands with the double side-scroll mouse device which are then transmitted as electric signals to the computing device. The embodiment is adapted to be operated by a thumb, an index finger and a middle finger of the user (see FIG. 1). The computing device may be a desktop computer, a laptop computer, a tablet computer or other similar devices.

The double side-scroll mouse device includes a housing unit 1, a main button unit 2, a side scroll unit 3, a sensor unit (not shown), and a processing unit (not shown).

The housing unit 1 has a lower casing 11, and a casing side skirt 12 that is connected to the lower casing 11.

The housing unit 1 is configured for placement on a work surface (not shown). In this embodiment, the work surface is a mouse pad or a table top.

Figure 3:
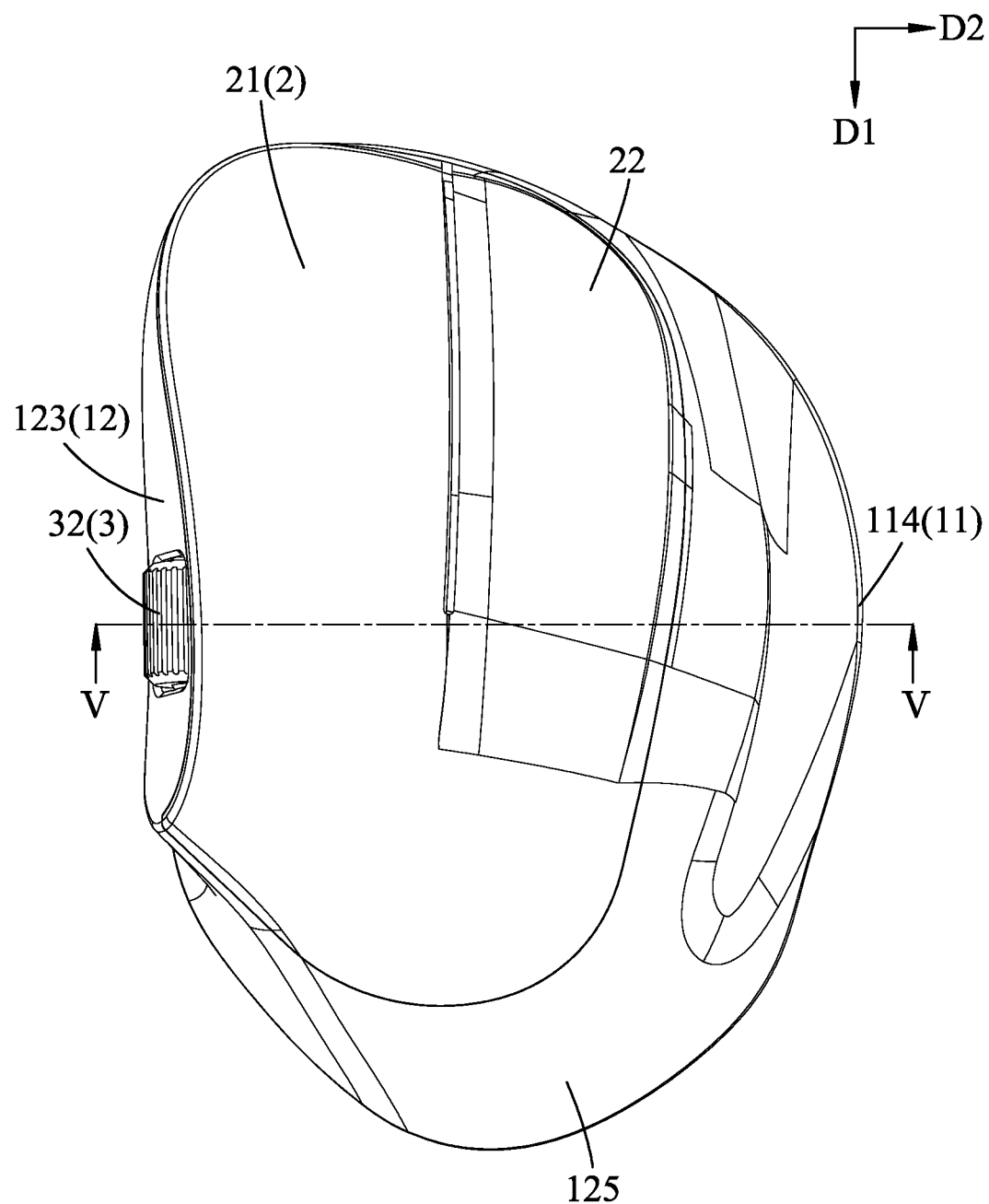
FIG. 3 is a top view of the embodiment.
Figure 4:
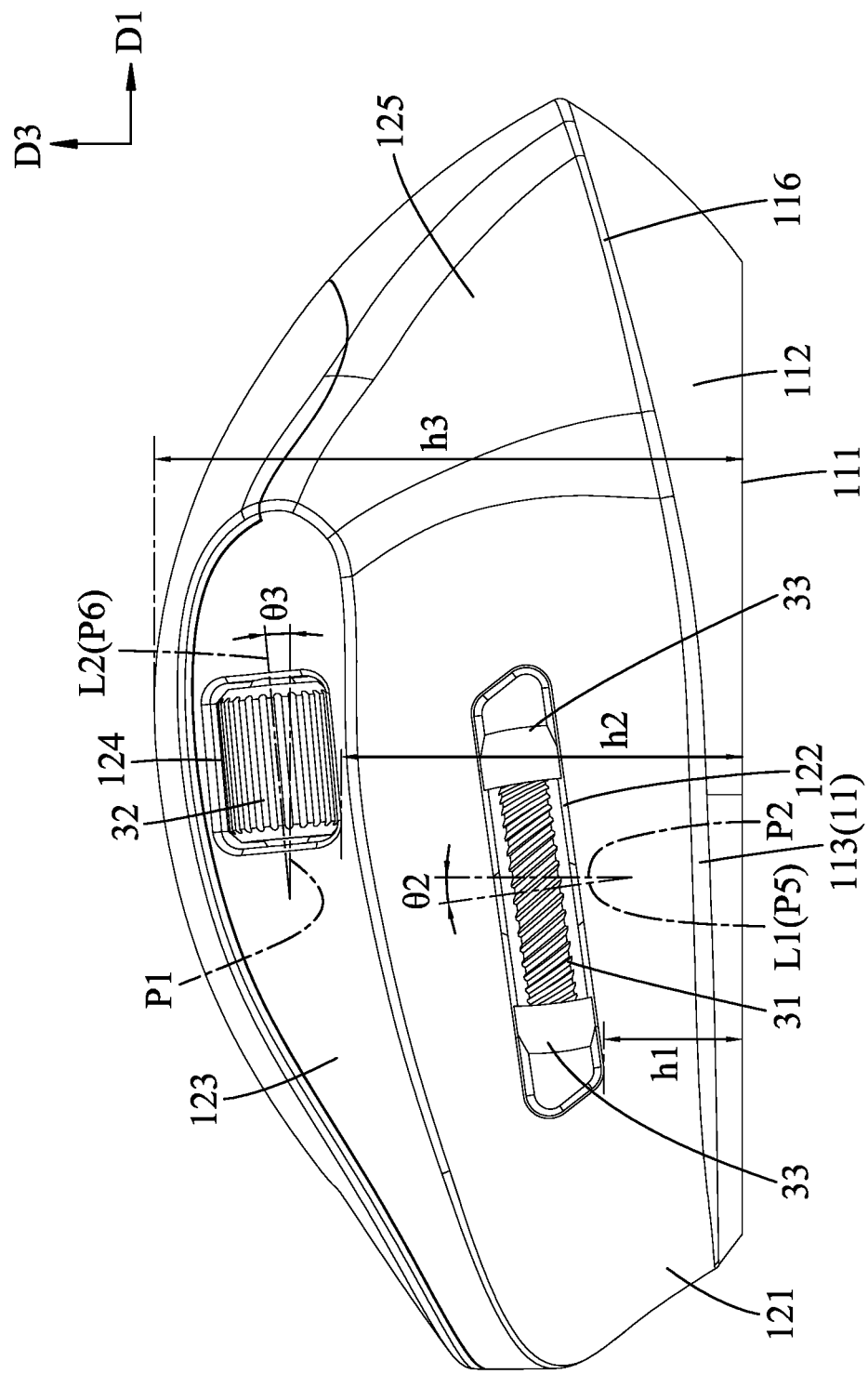
FIG. 4 is a side view showing the first and second scroll wheel members.

Referring to FIGS. 2, 3, and 4, the lower casing 11 has a bottom face portion 111, an extension face portion 112, a first lateral face portion 113, a second lateral face portion 114, a front face portion 115, and a rear face portion 116. The extension face portion 112 is disposed above, surrounds, and is connected to the bottom face portion 111. The first lateral face portion 113 is disposed above and connected to the extension face portion 112. The second lateral face portion 114 is disposed above and connected to the extension face portion 112, and is spaced apart from the first lateral face portion 113 in a left-right direction (D2). The front face portion 115 is disposed above and connected to the extension face portion 112, and interconnecting front ends of the first lateral face portion 113 and the second lateral face portion 114. The rear face portion 116 is disposed above and connected to the extension face portion 112, is spaced apart from the front face portion 115 in a front-rear direction (D1) that is perpendicular to the left-right direction (D2), and interconnecting rear ends of the first lateral face portion 113 and the second lateral face portion 114. A rear part of the extension face portion 112 has a height in a top-bottom direction (D3) that is perpendicular to the left-right direction (D2) and the front-rear direction (D1). The height of the rear part of the extension face portion 112 increases rearwardly. A rear end of the rear face portion 116 is higher in the top-bottom direction (D3) than a front end of the front face portion 115.

Figure 5:
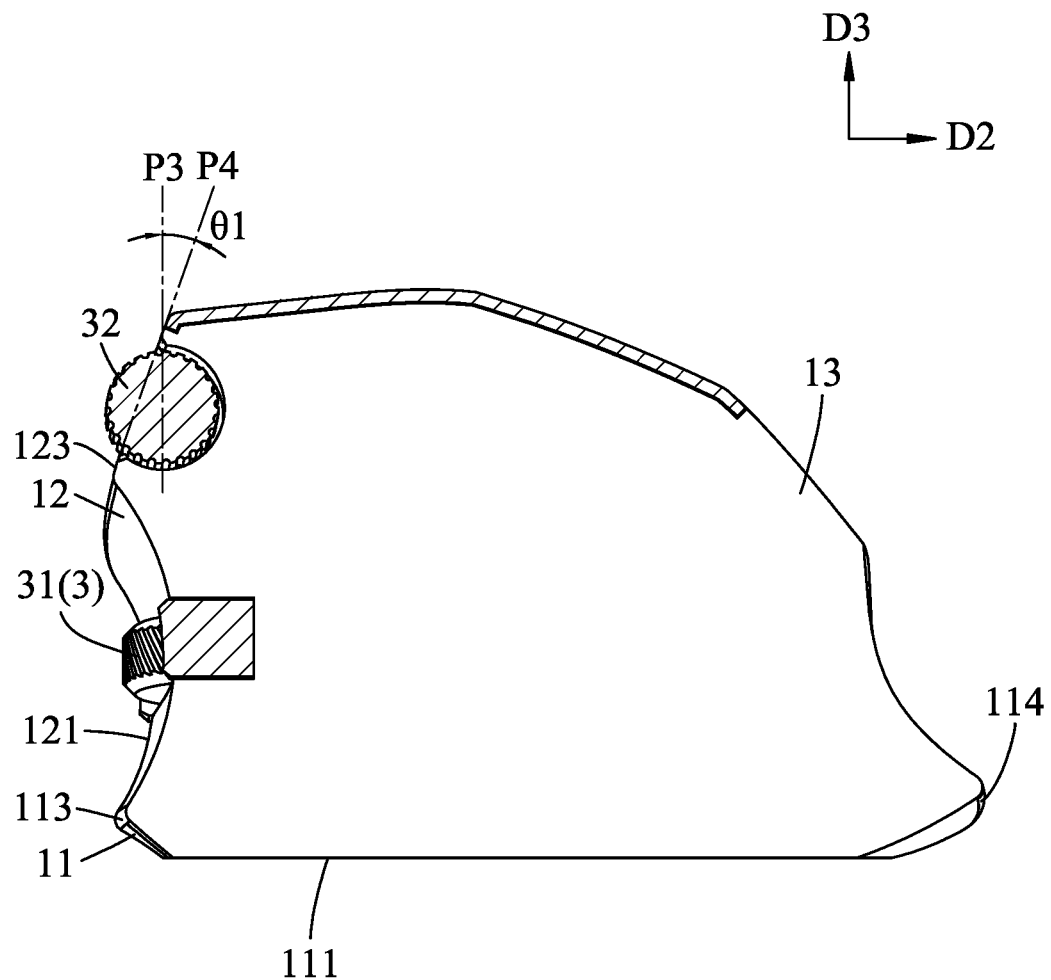
FIG. 5 is a cross sectional view of the embodiment taken from line V-V in FIG. 3.

Referring to FIGS. 3, 4, and 5, the casing side skirt 12 has a first operating wall portion 121 extending upwardly from one of the first lateral face portion 113 and the second lateral face portion 114 of the lower casing 11. In this embodiment, the first operating wall portion 121 extends upwardly from the first lateral face portion 113. The casing side skirt 12 further has a second operating wall portion 123 extending upwardly from an upper end of the first operating wall portion 121, and a palm supporting portion 125 connected to the first operating wall portion 121 and the second operating wall portion 123 and cooperating with the first operating wall portion 121 and the second operating wall portion 123 to cover the lower casing 11. The housing unit 1 further has an inner space 13 that is defined among the lower casing 11 and the first operating wall portion 121, the second operating wall portion 123, and the palm supporting portion 125 of the casing side skirt 12.

Referring to FIGS. 2, 4, and 5, the first operating wall portion 121 has a first socket 122 that is in spatial communication with the inner space 13. In this embodiment, the first operating wall portion 121 is a concave surface.

The second operating wall portion 123 has a second socket 124 that is in spatial communication with the inner space 13. In this embodiment, a chamfer angle (θ1) between an extension imaginary plane (P4) that passes through opposite top and bottom ends of the second operating wall portion 123 and a second vertical plane (P3) that is normal to the left-right direction (D2) ranges from 10° to 30°.

Referring to FIGS. 1 and 2, the main button unit 2 includes a first mouse button 21 that is located above the housing unit 1, that is adapted for operation by the index finger of the user, and that generates a first mouse button signal when operated. The main button unit 2 further includes a second mouse button 22 that is located above the housing unit 1, that is adapted for operation by the middle finger, and that generates a second mouse button signal when operated.

The side scroll unit 3 includes a first scroll wheel member 31, a second scroll wheel member 32, and two auxiliary buttons 33. The first scroll wheel member 31 is disposed on the first operating wall portion 121 and is rotatable about a first axis (L1) being perpendicular to the left-right direction (D2). The second scroll wheel member 32 is disposed on the second operating wall portion 123 and is rotatable about a second axis (L2) being perpendicular to the left-right direction (D2). More specifically, the first scroll wheel member 31 is mounted in and partially exposed from the first socket 122 of the first operating wall portion 121, and the second scroll wheel member 32 is mounted in and partially exposed from the second socket 124 of the second operating wall portion 123. The two auxiliary buttons 33 are mounted in the first socket 122, and are disposed respectively at opposite sides of the first scroll wheel member 31 in the front-rear direction (D1). Both the first and the second scroll wheel members 31, 32 are adapted for operation by the thumb, from which a first scrolling signal and a second scrolling signal may be generated, respectively; the two auxiliary buttons 33 are also adapted for operation by the thumb, from which two auxiliary signals may be generated, respectively.

Referring to FIGS. 2, 4, and 5, in this embodiment, a portion of the first scroll wheel member 31 that is partially exposed from the first socket 122, and a portion of the second scroll wheel member 32 that is partially exposed from the second socket 124 are substantially aligned with the first lateral face portion 113.

The first scroll wheel member 31 has a first surrounding surface 311 that surrounds the first axis (L1), that is partially exposed from the first socket 122, and that is disposed above the first lateral face portion 113.

A first angle (θ2) between a first imaginary plane (P5) that overlaps the first axis (L1) and that extends in the left-right direction (D2) and a first vertical plane (P2) that is normal to the front-rear direction (D1) ranges from 10° to 30°. Specifically, the first axis (L1) is offset from the top-bottom direction (D3), and the first scroll wheel member 31 which is rotatable about the first axis (L1), rotates at an inclined angle relative to the work surface with a front end of the first scroll wheel member 31 being lower than a rear end of the first scroll wheel member 31. The configuration of the inclined rear face portion 116 and the configuration of the first scroll wheel member 31 rotating at an inclined angle allow the thumb of the user to access the first scroll wheel member 31 with a front-rear movement at a more ergonomic angle.

The second scroll wheel member 32 has a second surrounding surface 321 that surrounds the second axis (L2), that is partially exposed from the second socket 124, and that is disposed above the first lateral face portion 113.

A second angle (θ3) between a second imaginary plane (P6) that overlaps the second axis (L2) and that extends in the left-right direction (D2) and a first horizontal plane (P1) that is normal to a top-bottom direction (D3) ranges from 10° to 30°. Specifically, the second axis (L1) is offset from the front-rear direction (D1), and the second scroll wheel member 32 which is rotatable about the second axis (L2), rotates at an inclined angle relative to the work surface with a front end of the second scroll wheel member 32 being lower than a rear end of the second scroll wheel member 32. The configuration of the inclined rear face portion 116 and the configuration of the second scroll wheel member 32 rotating at an inclined angle allow the thumb of the user to access the second scroll wheel member 32 with an upwards-and-downwards movement at a more ergonomic angle. Additionally, in this embodiment, the second scroll wheel member 32 is located rearwardly of the first axis (L1) in the front-rear direction.

The first axis (L1) is substantially perpendicular to the second axis (L2). In other words, the first scroll wheel member 31 and the second scroll wheel member 32 are configured for scrolling in different directions.

Referring to FIGS. 2 and 4, a lowest end of the first scroll wheel member 31 is spaced apart from the bottom face portion 111 in the top-bottom direction (D3) by a first distance (h1). A lowest end of the second scroll wheel member 32 is spaced apart from the bottom face portion 111 in the top-bottom direction (D3) by a second distance (h2). A top end of the main button unit 2 is spaced apart from the bottom face portion 111 in the top-bottom direction (D3) by a third distance (h3). The second distance (h2) is substantially three times the first distance (h1), and the third distance (h3) is substantially four times the first distance (h1).

The sensor unit is disposed in the housing unit 1, and has a light source (note shown) that emits light to shine below the double side-scroll mouse device to be reflected by the work surface and detected by a photocell (not shown) of the sensor unit. The photocell measures changes in the reflected light source and generates a translation signal.

The processor unit is disposed in the inner space 13 and electrically connected to the main button unit 2, the side scroll unit 3, and the sensor unit. The processor receives the first mouse button signal, the second mouse button signal, the auxiliary button signals, the first scrolling signal, and the second scrolling signal, and transmits commands to the computing device to perform clicks, webpage scrolling, and menu selections.

It should be noted that the sensor unit and the processing unit are technical features that are well known in the field of computer mouse technology, and are not the salient features of the present disclosure. Therefore, further details elaborating the function of the sensor unit and the processing unit are omitted for the sake of brevity.

In the double side-scroll mouse device according to the present disclosure, the first scroll wheel member 31 of the side scroll unit 3 is rotatable about the first axis (L1) and is adapted for operation by the thumb, allowing the user to access the first scroll wheel member 31 in a front-rear movement, and the second scroll wheel member 32 is rotatable about the second axis (L2) and is adapted for operation by the thumb, allowing the user to access the second scroll wheel member 32 in an upwards-and-downwards movement. By virtue of the user accessing the first and second scroll wheel members 31, 32 via different movements of the thumb allows, the user may transition seamlessly between operating the first and second scroll wheel members 31, 32 and index the first and second scroll wheel members 31, 32 via the two different movements. This improves the user experience of the double side-scroll mouse device and increases its operating efficiency and convenience.

By virtue of the first angle (02) and the second angle (03) ranging from 10° to 30°, and the rear face portion 116 being inclined with a rear part thereof being higher than a front part thereof in accordance with the configuration of the extension face portion 112, the user's thumb may have better access to the first and second scroll wheel members 31, 32 and operate the first and second scroll wheel members 31, 32 from a more ergonomically efficient angle. Furthermore, by virtue of having a portion of the first scroll wheel member 31 that is partially exposed from the first socket 122, and a portion of the second scroll wheel member 32 that is partially exposed from the second socket 124 be substantially aligned with the first lateral face portion 113, the user's thumb may transition seamlessly from operating one of the first and second scroll wheel members 31, 32 to the other one, and increase the user's comfort.

In summary of the above, the double side-scroll mouse device according to the present disclosure has an elegant structure which improve user experience, and therefore the object of the present disclosure has been achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A double side-scroll mouse device adapted to be operated by a thumb, an index finger and a middle finger of a user, said double side-scroll mouse device comprising:
   a housing unit has
      a lower casing that has a bottom face portion, an extension face portion disposed above, surrounding, and connected to said bottom face portion, a first lateral face portion disposed above and connected to said extension face portion, and a second lateral face portion disposed above and connected to said extension face portion, and spaced apart from said first lateral face portion in a left-right direction, and
      a casing side skirt that is connected to said lower casing, and that has a first operating wall portion extending upwardly from one of said first lateral face portion and said second lateral face portion of said lower casing, a second operating wall portion extending upwardly from an upper end of said first operating wall portion, and a palm supporting portion connected to said first operating wall portion and said second operating wall portion and cooperating with said first operating wall portion and said second operating wall portion to cover said lower casing;
   a main button unit including a first mouse button that is located above said housing unit and that is adapted for operation by the index finger, and a second mouse button that is located above said housing unit and that is adapted for operation by the middle finger; and a side scroll unit including a first scroll wheel member that is disposed on said first operating wall portion and that is rotatable about a first axis being perpendicular to the left-right direction, and a second scroll wheel member that is disposed on said second operating wall portion and that is rotatable about a second axis being perpendicular to the left-right direction and being substantially perpendicular to the first axis, said first and second scroll wheel members being adapted for operation by the thumb.

2. The double side-scroll mouse device as claimed in claim 1, wherein:

said housing unit further has an inner space that is defined among said lower casing and said first operating wall portion, said second operating wall portion, and said palm supporting portion of said casing side skirt;

said first operating wall portion has a first socket that is in spatial communication with said inner space;

said second operating wall portion has a second socket that is in spatial communication with said inner space; and said first scroll wheel member is mounted in and partially exposed from said first socket, and said second scroll wheel member is mounted in and partially exposed from said second socket.

3. The double side-scroll mouse device as claimed in claim 2, wherein:

said first operating wall portion extends upwardly from said first lateral face portion of said lower casing;

said first scroll wheel member has a first surrounding surface that surrounds the first axis, that is partially exposed from said first socket, and that is disposed above said first lateral face portion; and said second scroll wheel member has a second surrounding surface that surrounds the second axis, that is partially exposed from said second socket, and that is disposed above said first lateral face portion.

4. The double side-scroll mouse device as claimed in claim 2, wherein said side scroll unit further includes two auxiliary buttons that are mounted in said first socket, and that are disposed respectively at opposite sides of said first scroll wheel member in a front-rear direction perpendicular to the left-right direction.

5. The double side-scroll mouse device as claimed in claim 1, wherein a first angle between a first imaginary plane that overlaps the first axis and that extends in the left-right direction and a first vertical plane that is normal to a front-rear direction perpendicular to the left-right direction ranges from 100 to 30°.

6. The double side-scroll mouse device as claimed in claim 1, wherein a second angle between a second imaginary plane that overlaps the second axis and that extends in the left-right direction and a first horizontal plane that is normal to a top-bottom direction perpendicular to the left-right direction ranges from 10° to 30°.

7. The double side-scroll mouse device as claimed in claim 1, wherein said first operating wall portion is a concave surface.

8. The double side-scroll mouse device as claimed in claim 1, wherein a chamfer angle between an extension imaginary plane that passes through opposite top and bottom ends of said second operating wall portion and a second vertical plane that is normal to the left-right direction ranges from 10° to 30°.

9. The double side-scroll mouse device as claimed in claim 1, wherein:

a lowest end of said first scroll wheel member is spaced apart from said bottom face portion in a top-bottom direction perpendicular to the left-right direction by a first distance;

a lowest end of said second scroll wheel member is spaced apart from said bottom face portion in the top-bottom direction by a second distance;

a top end of said main button unit is spaced apart from said bottom face portion in the top-bottom direction by a third distance; and the second distance is substantially three times the first distance, and the third distance is substantially four times the first distance.

10. The double side-scroll mouse device as claimed in claim 1, wherein said second scroll wheel member is located rearwardly of the first axis in a front-rear direction perpendicular to the left-right direction.

\* \* \* \* \*

UNITED STATES PATENT AND TRADEMARK OFFICE
CERTIFICATE OF CORRECTION

Page 1 of 1

PATENT NO.       : 11,893,168 B1
APPLICATION NO.  : 18/315794
DATED            : February 6, 2024
INVENTOR(S)      : Chun-Chieh Chen et al.

It is certified that error appears in the above-identified patent and that said Letters Patent is hereby corrected as shown below:

In the Claims

Column 8 Line 4 Claim 5 should read:
The double side-scroll mouse device as claimed in claim 1, wherein a first angle between a first imaginary plane that overlaps the first axis and that extends in the left-right direction and a first vertical plane that is normal to a front-rear direction perpendicular to the left-right direction ranges from 10° to 30°.

Signed and Sealed this
Eighteenth Day of June, 2024

Katherine Kelly Vidal
*Director of the United States Patent and Trademark Office*